United States Patent [19]

Bauer

[11] 4,018,413
[45] Apr. 19, 1977

[54] ELECTRICAL EQUIPMENT MOUNTING APPARATUS INCLUDING A MOVABLE MOUNTING MEMBER

[75] Inventor: Johann Bauer, Amberg, Germany

[73] Assignee: Siemens Aktiengesellschaft, Munich, Germany

[22] Filed: Aug. 6, 1975

[21] Appl. No.: 602,469

Related U.S. Application Data

[63] Continuation of Ser. No. 488,838, July 15, 1974, abandoned.

[52] U.S. Cl. .................. 248/214; 339/198 GA
[51] Int. Cl.² .................. E04G 3/00; H01R 9/00
[58] Field of Search .................. 248/214, 223; 24/230 AN, 211 K, 216, 217; 212/74, 175; 339/198 GA

[56] References Cited

UNITED STATES PATENTS 1,074,944  10/1913  Geesey .................. 292/74

FOREIGN PATENTS OR APPLICATIONS 1,317,392  1/1963  France .................. 339/198 GA
1,921,811  11/1970  Germany .................. 339/198 GA
890,208  9/1953  Germany .................. 339/198 GA
1,115,803  10/1961  Germany .................. 339/198 GA
1,415,689  10/1968  Germany .................. 339/198 GA
340,536  10/1959  Germany .................. 339/198 GA

*Primary Examiner*—Robert A. Hafer
*Attorney, Agent, or Firm*—Kenyon & Kenyon Reilly Carr & Chapin

[57] ABSTRACT

An electrical equipment apparatus which includes an equipment housing and at least one slidable mounting member for fastening the equipment to a support rail. The member is guided by guide keys provided in the equipment housing and includes a compression spring disposed in a longitudinal recess thereof which engages the member at one end and the equipment housing at the other. Barb-like, resilient stop members are formed on the mounting member and extend transversely with respect to the direction of movement thereof, and are received by recesses in the equipment housing for limiting the movement of the mounting member and equipment with respect to the housing.

2 Claims, 5 Drawing Figures

ELECTRICAL EQUIPMENT MOUNTING APPARATUS INCLUDING A MOVABLE MOUNTING MEMBER

This is a continuation, of application Ser. No. 488,838 filed July 15, 1974, now abandoned.

BACKGROUND OF THE INVENTION

1. Field of the Invention

This invention relates generally to electrical equipment housings, and in particular to a movement limiting mounting apparatus for movably fastening electrical equipment within such housings.

2. Description of the Prior Art

Mounting arrangements of the above-mentioned type are generally known in the art. See, for example, German Design Pat. No. 7,036,089. In such prior art arrangements, a single mounting member or "slider" and only one compression spring need be used, but it is necessary to first insert the slider into slots provided in the equipment housing, and then insert the compression spring, in a fully compressed condition, between the slider and the housing wall. Aside from the fact that the slider generally can only be inserted if the electrical equipment is not in place in the housing, such installation is not particularly practical, especially when retrofitted installation of the slider is desired.

SUMMARY OF THE INVENTION

It is therefore an object of the invention to overcome the aforementioned disadvantages of heretofore known electrical equipment housings and to provide an improved slidable mounting arrangement which is simple in construction and is easy to install.

These and other objects of the invention are achieved in an electrical equipment apparatus which includes an equipment housing and at least one slidable mounting member for fastening the electrical equipment to a support rail. The mounting member is guided by guide keys provided in the equipment housing and includes a compression spring having one end thereof disposed in engagement with the mounting member and the other end thereof in engagement with the equipment housing. Barb-like, resilient stop members are formed in the mounting member transversely with respect to the direction of movement of the member, and cooperate with recesses provided in the equipment housing to limit the movement of the member.

The mounting member preferably has a longitudinal recess for receiving the compression spring which simplifies installation thereof, and an elongated slot on one side of the recess which maintains the parts necessary to form the stop members at a minimum and provides the resilient characteristics thereof. These and other features of the inventive apparatus will be discussed in further detail in the following detailed description.

DETAILED DESCRIPTION

Figure 2:
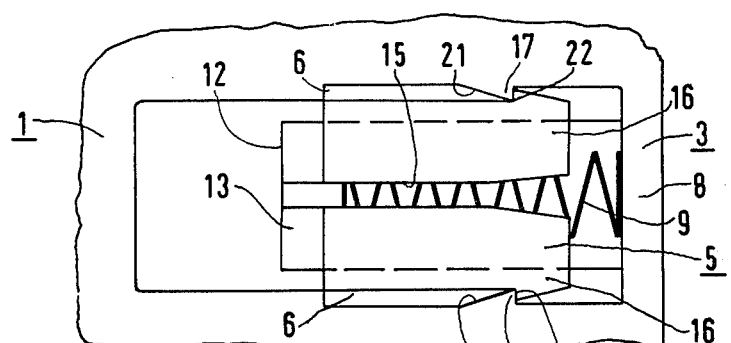
FIG. 2 is a bottom plan view of the member and housing of FIG. 1.
Figure 1:
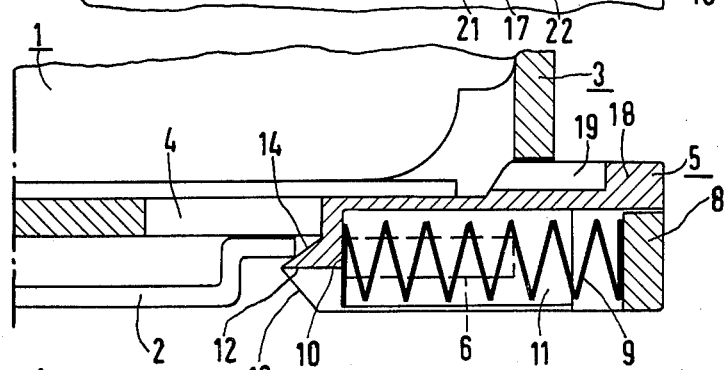
FIG. 1 is a partial cross-sectional side view of a mounting member and electrical equipment housing constructed according to the invention.

Referring now to the drawings, there is shown in schematic form electrical equipment (in this case a contactor) generally designated 1 which is slidably fastened to a support rail 2. The equipment is disposed within a housing 3 which includes a slot 4 in which a slidable mounting member 5 is movably disposed. Guide keys 6 provided in the housing engage guide slots 7 on member 5 and guide the latter in housing 3. One wall 8 of slot 4 serves as a support surface for one end of a compression spring 9, the other end of which engages the bottom 10 of a longitudinal recess 11 provided in member 5. The latter member is provided with a wedge-shaped end 12 which includes a first inclined surface 13 (which causes the return of member 5 when the latter snaps in the housing behind rail 2) and a second inclined surface 14 (which securely fastens equipment 1 at rail 2). Recess 11 includes an elongated slot 15 on one side thereof and forms a pair of barb-like, resilient stop members 16 on member 5, which stop members cooperate with recesses provided in housing 3 and limit the movement of member 5 if equipment 1 is removed from rail 2. The resiliency of member 16 is determined by the width of slot 15, and the members are arranged so as to face the bottom of the electrical equipment disposed in the housing. This enables the mounting member to be disengaged from the housing from the outside. Opposite members 16 is an extension 18, including a surface recess 19, which enables the insertion of a screwdriver or similar tool therein for removing member 5 and releasing rail 2.

Figure 3:
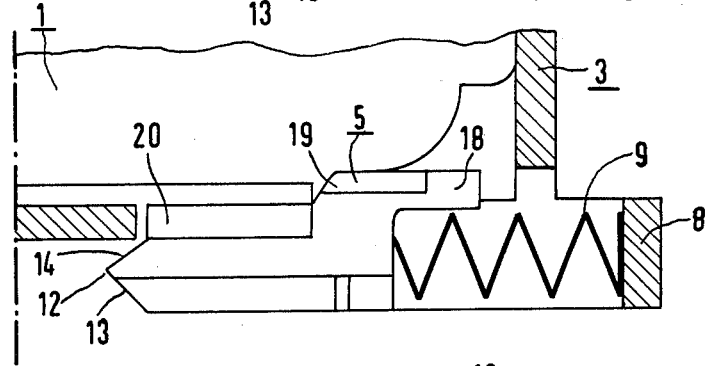
FIG. 3 is another cross-sectional view of the member and housing of FIG. 1, showing the member before insertion into the equipment housing.
Figure 5:
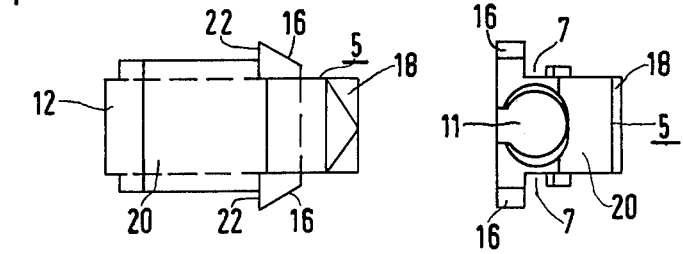
FIG. 5 is a top plan view thereof.
Figure 4:
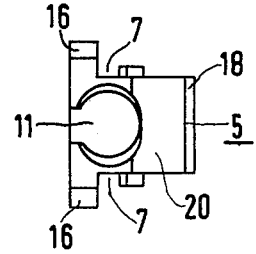
FIG. 4 is a frontal end view of the mounting member of the invention.

In order to insert the mounting member in the housing, spring 9 is first placed in recess 11. The mounting member is then disposed in the position illustrated in FIG. 3 and guided into slot 4 by means of rectangular extension 20 provided thereon. Thus inserted, the stop members are disposed at the bottom of the electrical equipment. The stop members also guide the mounting member during insertion as spring 9 is compressed to facilitate interengagement of keys 6 and slots 7. Starting surfaces 21 on projections 17 are also provided adjacent the recesses so that the stop members are compressed inwardly during insertion towards each other and snap into the recesses behind edge 22 thereof after passing the latter. After engagement with the recesses, the mounting member may still be moved further inwardly until stop members 16 abut the equipment housing. Retrofitting installation of the mounting member can thus be easily achieved.

In the foregoing specification, the invention has been described with reference to specific exemplary embodiments thereof. It will, however, be evident, that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In an electrical equipment apparatus including an equipment housing (1) and at least one slidable mounting member (5) for fastening the electrical equipment to a support rail (2), said mounting member being guided by guide keys (6) provided in said equipment housing and including a compression spring (9) having one end thereof disposed in engagement with said mounting member and the other end thereof in engagement with said equipment housing, the improvement comprising means for limiting the movement of said mounting member in said equipment housing when said equipment is removed from said rail including a pair of barb-like, resilient stop members (16) formed on said mounting member and extending transversely with respect to the direction of movement thereof, said mounting member including a longitudinally disposed recess for receiving said compression spring, said recess having an elongated slot on one side thereof for permitting said stop members to be compressed inwardly for inserting and removing said mounting member into and from said equipment housing, and said equipment housing including recesses provided therein for receiving said stop members and starting surfaces (21) inclined inwardly toward the sides of said mounting member for guiding said stop members into said recesses, said stop members cooperating with said recesses for limiting the movement of said mounting member in said equipment housing.

2. The apparatus recited in claim 1, wherein said mounting member further comprises a surface recess in one side thereof for receiving a retraction tool and facilitating removal of said mounting member from said housing.

* * * * *